(No Model.) 2 Sheets—Sheet 1.
T. MAJOR.
STRAW STACKER.
No. 291,755. Patented Jan. 8, 1884.
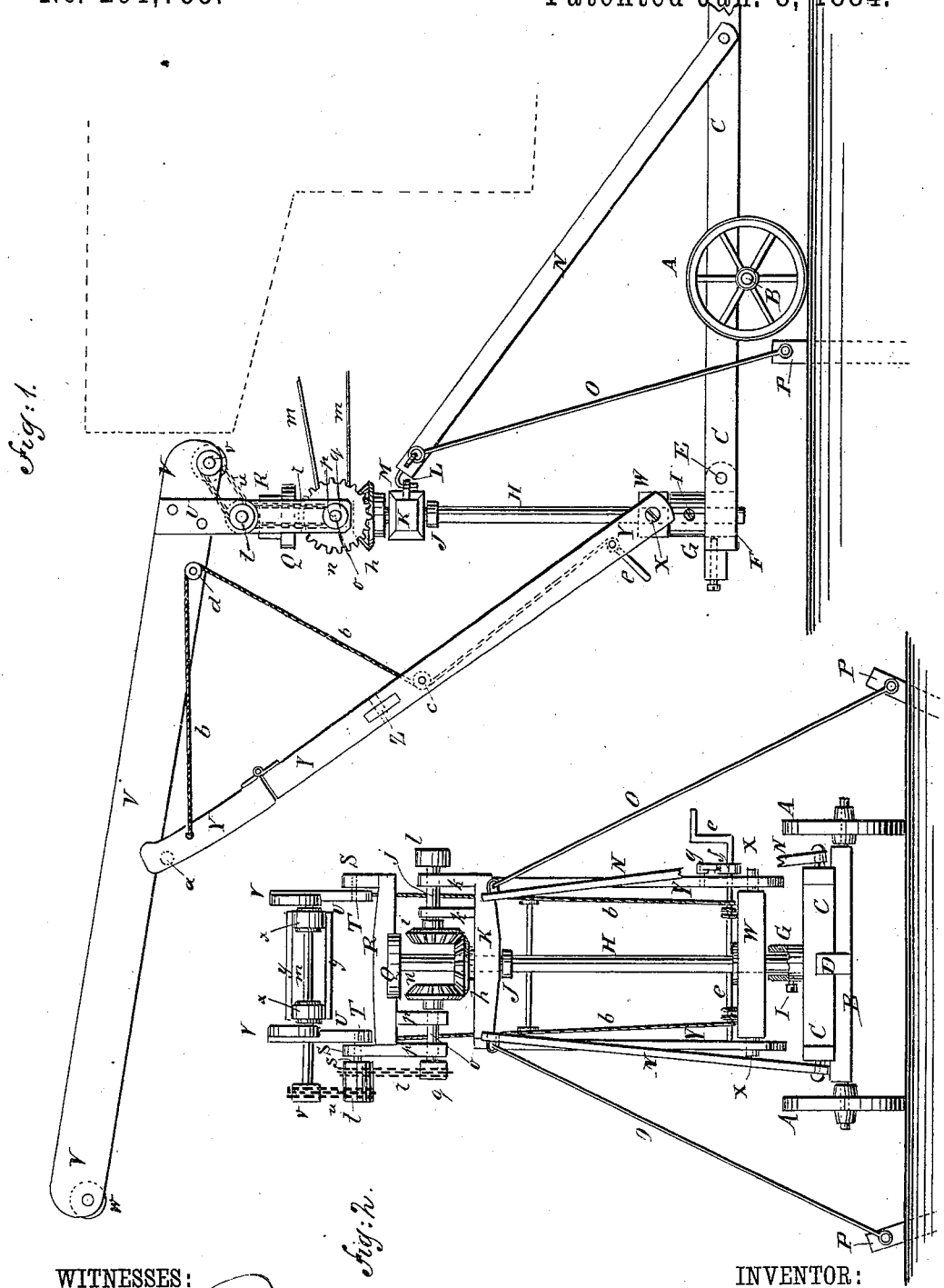
WITNESSES:
Chas. Nida
C. Sedgwick
INVENTOR:
T. Major
BY Munn & Co
ATTORNEYS.

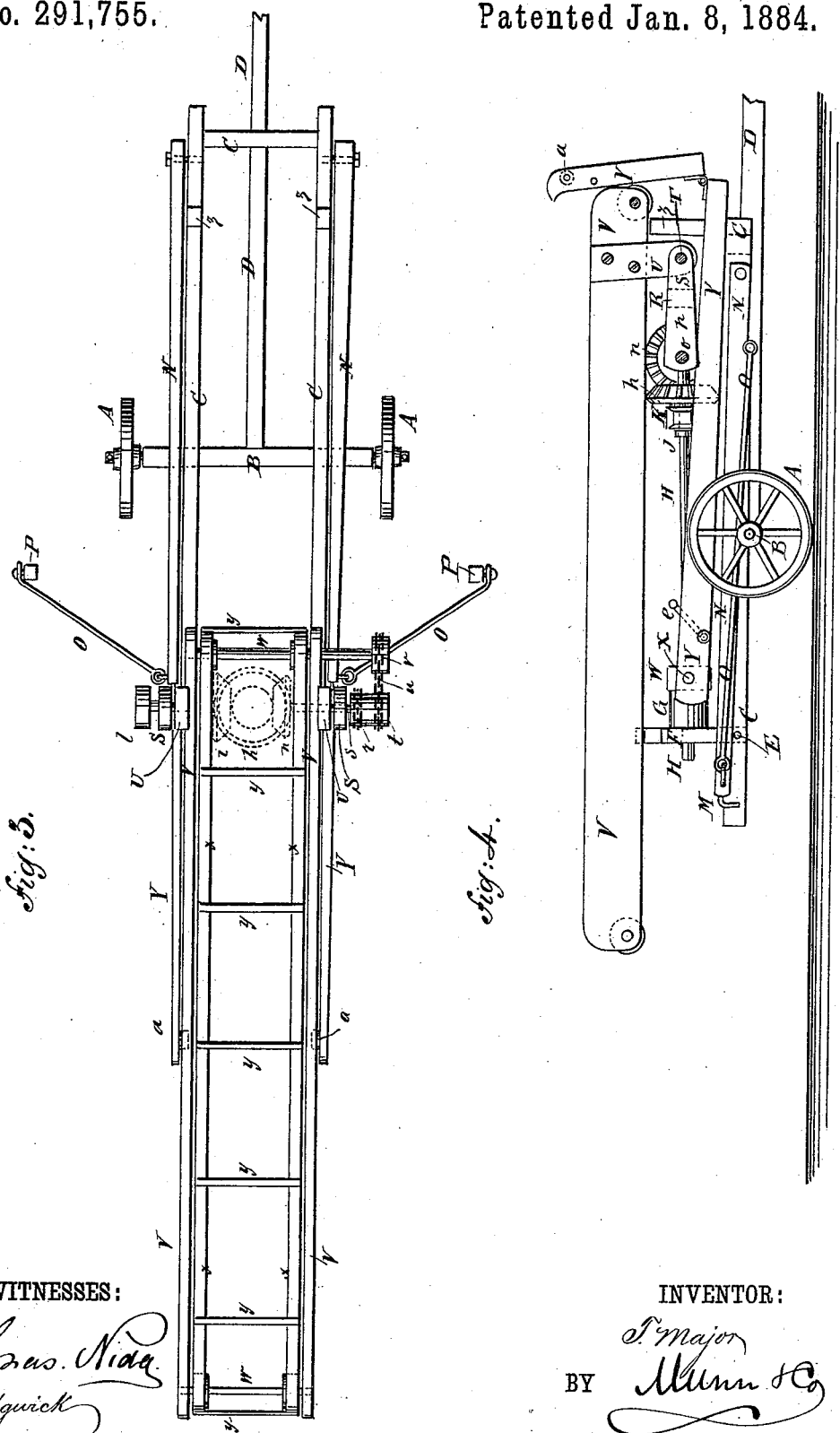

UNITED STATES PATENT OFFICE.

THOMAS MAJOR, OF JACKSON TOWNSHIP, CLINTON COUNTY, INDIANA.

STRAW-STACKER.

SPECIFICATION forming part of Letters Patent No. 291,755, dated January 8, 1884.

Application filed August 18, 1883. (No model.)

*To all whom it may concern:*

Be it known that I, THOMAS MAJOR, of Jackson township, in the county of Clinton and State of Indiana, have invented a new and useful Improvement in Straw-Stackers, of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improvement. Fig. 2, Sheet 1, is a front elevation of the same. Fig. 3, Sheet 2, is a plan view of the same. Fig. 4, Sheet 2, is a side elevation of the same folded for transportation.

The object of this invention is to facilitate the adjusting, controlling, and transporting of straw-stackers, and promote efficiency in the operation of such straw-stackers.

A are the wheels, to the axle B of which is attached the base-frame C of the stacker.

D is the tongue, which is attached to the forward part of the frame C, or to the frame C and axle B.

To the side bars of the base-frame C, near their rear ends, is hinged by a bolt or rod, E, the forward edge of a block, F, to which, near its rear edge, is secured a socket, G, to receive the lower end of an upright shaft, H. The shaft H is secured, adjustably, in the socket G by a set-screw, I. The outer edge of the block F, or a bar attached to the said block, projects beyond the ends of the side bars of the base-frame C, and is extended across the said ends. The outer edge of the extended rear corners of the block F is rabbeted, to form seats for the side bars of the carrier-frame when the stacker is folded.

Upon the upper part of the shaft H is formed, or to it is attached, a collar, J, upon which rests a cross-bar, K.

To the forward sides of the end parts of the cross-bar K are attached staples or eyebolts L, to receive the hooks M, attached to the ends of the stay-bars N, the other ends of which are shown in the drawings as being attached to the forward parts of the side bars of the base-frame C; but in practice the said ends may be attached to the frame of the thrasher or separator.

To the outer sides of the upper ends of the stays N are attached, by staples, eyebolts, or other suitable means, the upper ends of the guy rods or ropes O, the lower ends of which have eyes formed in them, to receive the stakes P, by which the said guy-rods are secured to the ground.

To the shaft H, a little below its upper end, is attached a collar or circular plate, Q, upon which rests a cross-bar, R.

Upon the ends of the cross-bar R are formed or to them are attached two short standards, S, to and between the upper ends of which are hinged by bolts T the lower ends of two hangers, U, attached to the lower parts of the side bars of the carrier-frame V.

Upon the lower part of the shaft H is placed a cross-bar, W, which rests upon the upper end of the socket G, or upon a washer or collar placed upon the said shaft above the said socket.

Upon the ends of the cross-bar W are formed journals X, upon which are placed the lower ends of the bars Y. The bars Y are connected at their middle parts by a cross-bar, Z, framed into or otherwise secured to the said bars Y.

To the inner sides of the upper ends of the brace-bars Y are pivoted small rollers $a$, upon which rest the lower edges of the side bars of the carrier-frame V, so that the weight of the carrier will be mainly supported from the lower part of the shaft H.

To the upper parts of the brace-bars Y are attached cords $b$, which pass around guide-pulleys $c$, journaled near the middle parts of the said brace-bars Y, over guide-pulleys $d$, journaled near the lower parts of the side bars of the carrier-frame V, and their ends are attached to and wound upon the crank-shaft $e$, or drums or spool attached to the said crank-shaft. With this construction, by turning the crank-shaft $e$ in one or the other direction, the outer or discharging end of the carrier-frame V can be raised or lowered to discharge the straw at a greater or less height, as may be desired. The crank-shaft $e$ is provided with a ratchet-wheel, $f$, and pawl $g$, to hold the carrier securely in any position into which it may be adjusted.

Upon the shaft H, above the cross-bar K, is placed a loose beveled-gear wheel, $h$, which rests and turns upon the said cross-bar, or upon a collar or washer placed upon the said shaft between the gear-wheel and cross-bar. The teeth of the gear-wheel *h* mesh into the teeth of a beveled-gear wheel, *i*, attached to the inner end of a short shaft, *j*, which revolves in bearings in the upper ends of short standards *k*. The lower ends of the standards *k* are attached to the cross-bar K at one side of the shaft H.

To the outer end of the shaft *j* is attached a pulley, *l*, to receive a belt, *m*, which is designed to receive motion from the driving mechanism of the thrasher. The teeth of the beveled-gear wheel *h* also mesh into the teeth of the beveled-gear wheel *n*, attached to the end of the short shaft *o*, which revolves in bearings in the lower ends of the hangers *p*, attached at their upper ends to the cross-bar R, at the side of the shaft H, opposite the standards *k*, so that the shafts *j o* will be in line with each other when the carrier-frame V is in line with the base-frame C, as shown in Figs. 1, 2, and 3, and so that the carrier-frame V can be turned at an angle with the base-frame C without throwing the gear-wheels *h i n* out of gear.

To the outer end of the shaft *o* is attached a small chain-wheel, *q*, around which passes an endless chain, *r*. The endless chain *r* also passes around a small chain-wheel, *s*, which revolves upon the projecting end of the bolt T as a pivot. With the chain-wheel *s* is rigidly connected a chain-wheel, *t*, around which passes an endless chain, *u*. The endless chain *u* also passes around a chain-wheel, *v*, attached to a journal of the lower roller, *w*, pivoted to the lower ends of the side bars of the carrier-frame V, around which and around a corresponding roller, *w*, pivoted to the upper ends of the said side bars, passes the endless belt *x* of the carrier. The carrier may be formed of narrow belts *x*, connected by cross-bars *y*; or it may be formed of a wide belt, *x*, having cross-bars *y* attached to it, as may be desired. With this construction the straw from the thrasher or separator is received upon the lower part of the carrier and is discharged from the upper end of the said carrier upon the stack. As the stack increases in height the outer end of the carrier can be gradually raised by operating the crank-shaft *e*, and at the same time the stacker can be turned laterally upon the shaft H through nearly the arc of a semicircle, so that the straw can be delivered upon any desired part of the stack.

When the stacker is to be folded for transportation or storage, the crank-shaft *e* is operated to lower the outer end of the carrier-frame V to the ground. The stay-bars N and guy-rods O are then detached, the cords *b* are removed from the pulleys *d*, the brace-bars Y and cross-bar W are swung around upon the shaft H, and laid upon the base-frame C, and the shaft H and the carrier are folded down upon the brace-bars Y.

If desired, short posts *z* can be attached to the base-frame C, to receive and support the folded parts of the stacker.

If desired, the brace-bars Y can be jointed to allow their projecting ends to be turned up, as shown in Fig. 4, when the stacker is folded.

Having thus fully described my invention, I claim as new and desire to secure by Letters Patent—

1. In a straw-stacker, the combination, with the upright or vertical shaft and upper cross-bar, provided with two independent shafts, geared to the upright shaft, of the uppermost cross-bar, resting upon a collar or plate on the upper end of the vertical shaft, and connected to one of the independent shafts, the carrier, and its hangers, connected to the uppermost cross-bar, substantially as and for the purpose set forth.

2. In a straw-stacker, the combination, with the upright shaft and the lower cross-bar, of the carrier-frame superposed above the said shaft, the side brace-bars connected to the lower cross-bar, and having rolls at its upper end, upon which the carrier-frame rests, the pulleys *c d*, one set arranged on the carrier-frame and the other set on the brace-bars, the crank-shaft *e*, and the cords *b*, with their upper ends connected to the said brace-bars, thence passed over the pulleys on the carrier-frame and back over the pulleys on the brace-bars, and connected to the crank-shaft *e*, substantially as and for the purpose set forth.

3. In a straw-stacker, the combination, with the cross-bar K, having standards *k*, the cross-bar R, having hangers *p* and standards S, the carrier-frame V, having hangers U, and the hinging bolts T, of the gear-wheels *h i n*, the shafts *j o*, and the chain-wheels and chains *q s t u r v*, substantially as herein shown and described, whereby the carrier can be adjusted vertically and laterally without affecting the driving mechanism, as set forth.

THOMAS MAJOR.

Witnesses:
WILLIAM T. WRIGHT,
ELI MARVIN.